United States Patent
Battlogg et al.

(10) Patent No.: US 8,453,806 B2
(45) Date of Patent: Jun. 4, 2013

(54) DAMPING DEVICE FOR A TWO-WHEELED VEHICLE

(75) Inventors: Stefan Battlogg, St. Anton (AT); Jürgen Pösel, Bludenz (AT); Gernot Elsensohn, St. Anton (AT); Martin Walhert, Aarberg (CH)

(73) Assignee: DT Swiss Inc., Grand Junction, CO (US)

( * ) Notice: Subject to any disclaimer, the term of this patent is extended or adjusted under 35 U.S.C. 154(b) by 58 days.

(21) Appl. No.: 12/839,748

(22) Filed: Jul. 20, 2010

(65) Prior Publication Data

US 2011/0017555 A1    Jan. 27, 2011

(30) Foreign Application Priority Data

Jul. 21, 2009  (DE) .................... 10 2009 034 298

(51) Int. Cl.
*F16F 15/03*        (2006.01)

(52) U.S. Cl.
USPC ............... 188/267; 188/267.1; 188/267.2; 188/266.3; 188/299.1; 267/64.15; 267/64.26

(58) Field of Classification Search
USPC  188/267, 267.1, 2, 266, 3, 299, 1; 267/64.15, 267/64.26
See application file for complete search history.

(56) References Cited

U.S. PATENT DOCUMENTS

| | | | |
|---|---|---|---|
| 6,131,709 A | 10/2000 | Jolly et al. | |
| 6,336,535 B1 * | 1/2002 | Lisenker | 188/267.2 |
| 6,382,369 B1 * | 5/2002 | Lisenker | 188/267.2 |
| 6,471,018 B1 | 10/2002 | Gordaninejad et al. | |
| 6,531,799 B1 * | 3/2003 | Miller | 310/114 |
| 6,874,603 B2 * | 4/2005 | Lisenker et al. | 188/267.2 |
| 8,051,961 B2 * | 11/2011 | Azekatsu et al. | 188/267.2 |

FOREIGN PATENT DOCUMENTS

DE     102006047775 A1 *  4/2008

* cited by examiner

*Primary Examiner* — Bradley King
*Assistant Examiner* — Mahbubur Rashid
(74) *Attorney, Agent, or Firm* — Greer, Burns & Crain, Ltd.

(57) ABSTRACT

A damping device for a two-wheeled vehicle having a first and a second damper chamber which are coupled to one another through a flow connection. The flow connection includes at least one flow valve provided with a damping channel. A magneto-rheological fluid is provided in the damping channel of the flow valve wherein the flow valve includes at least one magnetic device such that the damping channel of the flow valve can be exposed to a magnetic field of the magnetic device. The flow valve further includes at least one spring device. The magnetic device of the flow valve is provided on a valve piston and the valve piston is received in a deflection chamber to resiliently deflect counter to a spring force of the spring device such that the magnetic field of the magnetic device effective in the damping channel depends on the resilient deflection of the valve piston.

24 Claims, 6 Drawing Sheets

DAMPING DEVICE FOR A TWO-WHEELED VEHICLE

The present invention relates to a damping device for a two-wheeled vehicle and in particular for a bicycle, such as a rear wheel damper or a suspension fork. These two-wheeled vehicles are in particular human-powered or else they may be motor- or engine-powered or be equipped as a bicycle with an auxiliary drive.

Many different types of rear wheel dampers and also suspension forks for two-wheeled vehicles have become known in the prior art. Typically a damping unit for a rear wheel of a two-wheeled vehicle comprises at least one spring for cushioning shocks, and at least one damper for damping spring vibrations.

Dampers for two-wheeled vehicles and in particular bicycles tend to be operated with a damping fluid such as oil. For damping, the damping fluid is conveyed from a damping chamber to a second damping chamber through a flow valve throttling the flow. The valve may also be spring-biased. The valve may be configured as a valve gate or a throttle. The size of the valve gate aperture determines the damping strength. For application in bicycles it is desirable for the damping strength to be adjustable. An optimal damping is for example dependent on the terrain characteristics. Thus, for rides over roads, on forest paths or off-road, different damping settings will be optimal.

For adjusting and influencing damping, electro-rheological and magneto-rheological fluids have become known whose characteristics can be influenced by means of applying an electric or magnetic field. Magneto-rheological fluids for example tend to consist of a suspension of minuscule particles which are finely dispersed in a carrier liquid and which can be magnetically polarized. The polarizable particles tend to consist of carbonyl ferrous powder of typical diameters between 0.1 and 50 micrometers, forming chain-like structures under the influence of a magnetic field such that the magneto-rheological fluid viscosity will considerably rise under the influence of a magnetic field in particular perpendicular to the field lines of the magnetic field.

As the magnetic field is switched off, the viscosity will drop virtually instantaneously. Investigations have shown that the typical response times lie in the range of a few milliseconds or less. Thus, magneto-rheological fluids are suitable to be used in bicycle dampers.

With U.S. Pat. No. 6,471,018 B1, a magneto-rheological damper has become known in which an electromagnet exposes a flow passage between the first and the second damper chamber to a magnetic field to set the desired level of damping.

One advantage of magneto-rheological fluid dampers is that the characteristic damper curve can be influenced through the strength of the employed electric or magnetic field.

With DE 698 21 799 T2, an adjustable valve and a vibration damper for a bicycle have become known wherein a permanent magnet is employed for generating the magnetic field. Mechanical adjustment means serve to adjust the strength of the magnetic field which is effective on the passageway filled with a magneto-rheological fluid. The magnetic field strength is adjusted by varying the distance of the magnet from the passageway. As the distance increases, the field strength in the passageway decreases. In this way one adjusts the magnetic field strength in the passageway thus directly influencing the strength of the chain formation of the particles in the magneto-rheological fluid.

DE 698 21 799 T2 furthermore describes different settings of the magnetic field strength in the passageway for the compression stage and the rebound stage.

A damper according to DE 698 21 799 T2 is functional, comprising both in the rebound stage and in the compression stage a damping level adjusted by the magnetic field of the permanent magnet.

The system according to DE 698 21 799 T2 shows the drawback, however, that in operation a specific breakaway force must first be overcome until the magneto-rheological fluid flows through the damping channel since the magnetic field generated by the permanent magnet causes a specific chain formation of the magneto-rheological particles in the passageway. This means that no damping will occur for weak shocks but damping will only start with shocks of a strength above the breakaway force. The response reaction of damping is thus poor since only large shocks will be damped. The magnitude of the breakaway force can be adjusted via the strength of the magnetic field by way of increasing the distance of the permanent magnet from the gap to reduce the effective field, or by way of approaching the permanent magnet further towards the gap to increase the effective field. The drawback of this is, however, that the position of the permanent magnet must be changed for each desired strength of a shock from which the damper is intended to start operating. Shocks having smaller breakaway moments are not damped. In the case of shocks having larger breakaway moments the passageway opens and the shock is damped according to the field strength.

For a good, ergonomic response reaction a zero passage of the force-velocity lines is required such that small and minute forces will already trigger movement in an inactive piston. A zero passage of the characteristic damper curve is also required for a homogeneous transition from the compression to the rebound stage. In a system according to DE 698 21 799 T2, however, no zero passage is provided.

To obtain a zero passage of the characteristic damper curve and a low basic damping level effective already with weak shocks, DE 198 20 570 A1 has disclosed the use of a bypass channel in a damper with an electro-rheological fluid where the electro-rheological fluid can flow through the electric field without being influenced. Flow channels which can be subjected to an electric field are provided for controlling the damping characteristics. In this type of system the characteristic damper curve is defined by the configuration of the bypass channel and of the flow channel that can be subjected to an electric field.

This system again shows the general disadvantage though that in transition from the low-speed range to the high-speed range the breakaway force is overcome instantaneously. The force-velocity line of the damper shows a break. Due to the comparatively low basic load because of the relatively low bicycle weight the break point when used with bicycles lies in the continuous operating range of the damper and is disagreeable to bicycle riders since the damper response changes virtually instantaneously at said break. Furthermore abrupt changes of the damping response will also influence traction and thus may affect riding safety.

In known, conventional bicycle dampers so-called shim valves are used to avoid breaks in the characteristic damper curve at transition from the low-speed range to the high-speed range to ensure a smooth transition from the low-speed range to the high-speed range. For this purpose the shim valves comprise a plurality of thin metal plates provided at a flow channel. As the damping fluid flows from the flow channel to the metal plates of the shim valve said shim valve increasingly opens as the damper piston velocity increases since each metal plate is increasingly elastically bent. The result is a rounded, gentle transition from the low-speed range to the high-speed range of the characteristic damper curve. Abrupt changes in damper response are avoided and the wheels show significant traction. This smooth transition of the characteristic damper curve is significant for an advantageous bicycle operation.

Although a system equipped with shim valves is functional there is the drawback that its adaptation is impossible or else very complicated since the shim valves must for example be exchanged.

It is therefore the object of the present invention to provide a damping device comprising an adjustable transition range of the characteristic damper curve from the low-speed range to the high-speed range. It is in particular intended to allow effective damping for weak shocks as well. In preferred specific embodiments the damping level is intended to be readily adjustable over a large adjusting range.

This object is solved by a damping device having the features of claim 1 and by a damping device having the features of claim 34. Preferred specific embodiments of the damping device according to the invention are the subjects of the corresponding subclaims. Further advantages and features of the present invention can be taken from the embodiments.

The damping device according to the invention is in particular provided to be used in a bicycle and comprises at least one first damper chamber and at least one second damper chamber coupled to one another through at least one valve having at least one damping channel. Furthermore at least one magnetic device is provided and at least in the damping channel a fluid influenceable by a field is provided with the field generating device structured and suitable to be effective by means of a field on the fluid in the damping channel that is influenceable by a field. At least one adjusting device is provided with which to adjust the field effective in the damping channel. By means of the adjusting device one can adjust at least a portion of the cross-sectional area of the damping channel that is exposed to a field of a specific and in particular predetermined strength such that optionally only part of the cross-sectional area of the damping channel can be exposed to a field of a specific strength.

The damping device according to the invention has many advantages. One considerable advantage of the damping device according to the invention is that the cross-section of the damping channel does not need to be entirely and wholly exposed to a specific magnetic and/or electric field but it is possible to expose only a portion of the cross-section of the damping channel to the field. This may for example occur in that the gap size exposed to the field is adjusted via the adjusting device. For this purpose the field generating device and/or the damping channel may be configured to be adjustable relative to one another. The inhomogeneity of the field is utilized.

In practice the invention results quasi in partitioning the damping channel into multiple portions and in a simple case into a trisected gap of the damping channel having three different effective ranges: One effective section or effective range of the cross-section is exposed to the full field, a transition section or transition range of the cross-section is exposed to a sub-field only and one part of the cross-section—the bypass section—is not at all or hardly at all exposed to the field. Partition occurs in particular without any separate channels or partition walls in sections or ranges, not mechanically but preferably by way of the magnetic field only. This also holds for the bypass section that is formed by part of the cross-section of the damping channel.

Partitioning the cross-section of the damping channel occurs by way of a locally inhomogeneous field which has a low or very low strength in the bypass section and a high or higher strength in the effective section. Between the bypass section and the effective section the transition section is in particular provided which is configured to be highly inhomogeneous over its cross-sectional portion and over which the field strength increases from the lower value of the bypass section to the higher value of the effective section.

Preferably the field strength is rather constant over the cross-sectional portion of the effective section. Preferably the field strength is again rather constant over the cross-sectional portion of the bypass section. In the transition range the field strength is highly inhomogeneous, increasing from the low value in the bypass section to the high value in the effective section.

The at least one bypass section acts as a bypass channel, resulting in a zero passage of the characteristic damping device curve. Due to the variable cross-section size of the bypass channel the gradient of the characteristic damper curve can be adjusted as desired.

The transition range or transition section is only exposed to a sub-field which is in particular inhomogeneous—the attenuated edge field (stray field)—in which the chain formation of the particles is weak, increasingly attenuating towards the edge. In the case of weak loads, the transition range remains closed. In the case of weak loads, the sub-field virtually closes the transition range. In the case of weak loads or weak shocks, only the set bypass portion will determine the current operating point on the characteristic damper curve. The set bypass section defines the characteristic damper curve in the case of weak loads.

With increasing loads due to higher piston forces or piston velocity the flow of the damping fluid through the bypass section entrains the particles that are partially or weakly chained with one another firstly over a portion in the adjacent transition range. Furthermore, as loads increase, the shearing forces will exceed beyond the bonding forces of the chained particles. Consequently the flow cross-section of the bypass section increases with increasing loads and the cross-sectional area of the closed transition range decreases correspondingly. In this way a non-linear damper response is realized. The transition range of the characteristic damper curve from the low-speed range to the high-speed range becomes curved and an ergonomically adverse break point is reliably avoided. A characteristic damper curve can be generated that is continuous and asymptotic towards both ends. This results in many various options since for example a virtually non-influenced gap width in the damping channel is changeable continuously, quasi-continuously, or in specified increments. For example the cross-sectional area of the damping channel substantially non-influenced by a field can be adjustable in 10%, 20%, 25%, or 33% increments to expose to the magnetic field a corresponding portion of the cross-sectional area of the damping channel in two, three or more stages.

By means of the adjusting device one can preferably adjust the area portion of the cross-section of the damping channel on which a field of a specific strength is effective. The area portion of the damping channel that is not influenced by the field is virtually effective as a bypass such that by means of the field the cross-sectional area effective for weak shocks is correspondingly reduced while for shocks exceeding the breakaway force of the fluid that is exposed to the field and influenceable by a field, the entire cross-sectional area of the damping channel is employed for damping.

It is also conceivable that in addition to or else instead of the area portion, the volume portion of the damping channel on which the field of specific strength acts, is adjustable.

A mean value of a field strength or a total mean value may be determined over the entire cross-section of the damping channel. The field is inhomogeneous over the cross-section of the damping channel. By way of an adjusting device that cross-section portion may be set in which the field is stronger or weaker than the total mean value of the field strength.

In particular can the proportion be set of the maximal field strength and minimal field strength concurrently acting on the damping channel, while the area portion in which an above-average strength magnetic field is effected can be set as well. Preferably the area portion is adjustable over which the magnetic field is inhomogeneous, decreasing from maximal field strength to minimal field strength.

Preferred specific embodiments additionally provide for at least one strength of the field effective on the damping channel to be adjustable. This allows to also influence the level of the breakaway force in addition to adjusting the proportion of the cross-section of the damping channel.

The field generating device provided is in particular a magnetic device generating a magnetic field. An excellent fluid suitable therefor is a magneto-rheological fluid (MRF) which has a very rapid response to magnetic fields. The field generating device may be configured as a permanent magnet or an electromagnet. Magneto-rheological systems generally allow to adjust the characteristic damper curve a desired.

Other configurations may provide for the field generating device to be a generating device for an electric field. Electro-rheological fluids (ERF) are suitable therefor.

The field generating device employed is particularly preferably a magnetic device. Therefore the specific terms for the magnetic solution will be used below to employ clear language regarding the invention. Reference is made to the fact that the terms applicable to a solution having an electric field shall likewise apply such that "magnetic field" is intended to be understood below to include an "electric field". A magneto-rheological fluid is understood to mean an electro-rheological fluid in the case of an analogous electric solution, etc.

One embodiment of the invention provides for multiple magnetic poles to generate multiple transition ranges in the damping channel. These poles form a comb-like structure concentrating the magnetic field in multiple ranges, thus generating multiple transition ranges. In this way the effect of a transition range may be multiplied.

A comb-like component allows to generate multiple transition ranges by way of partitioning the magnetic poles. An adjustable magnet may for example have multiple gaps (poles) which cause transition ranges to be generated in the magnetic field.

The magnetic field strength may be adjusted by means of varying the gap width. Or else for example an auxiliary magnet may be coupled thereto to strengthen the magnetic field.

What is also conceivable is attenuating portions of or the entire field by way of magnetic short-circuits external of the channel section to be influenced by means of inserting some magnetically conducting material between the magnetic device and the passageway. Likewise at least sub-ranges of the magnetic field may be attenuated by increasing the "air gap" in the magnetic field by means of a magnetically non-conducting material.

What is also conceivable is changing the field strength through changes to the ferromagnetic pole elements which close the magnetic circuit external of the passageway. The entire magnetic flow can be influenced through the shape and the saturation field strength of the material.

In preferred embodiments the adjusting device may comprise at least one longitudinally displaceable adjusting member.

Preferably the adjusting device comprises at least one rotary device which rotary device in particular comprises at least one permanent magnet. A rotary device allows a compact structure and many various adjustment options. Moreover the adjustment option of a broad damping range by way of a rotational movement is highly user-friendly, a significant feature for use with a bicycle.

For increasing the transition range the rotary device might for example comprise a rotary magnet having multiple gaps (poles) that cause a corresponding number of transition ranges to be generated in the magnetic field to enlarge the transition range by means of this structure.

Preferably the rotary device comprises at least one rotary unit for adjusting at least one damping channel for the rebound stage and/or a rotary unit for adjusting at least one damping channel for the compression stage. It is also possible to provide a rotary unit that serves for adjusting the compression stage and the rebound stage.

Preferably, however, a rotary unit is provided for adjusting at least one damping channel for the rebound stage and a rotary unit for adjusting at least one damping channel for the compression stage with the two rotary units being configured coaxially.

In all the configurations and more specific embodiments at least one rotary unit of the rotary device or the entire rotary device is preferably provided on the piston rod.

In other configurations at least one rotary unit is disposed on the exterior of a damper chamber.

With at least one damping channel being provided at the damper piston and in particular on an external surface of the damper piston, a magnetic field passing through the damper body which consists in particular of a light metal, aluminum, magnesium, or of a fibrous composite material, may be effective on the damping channel provided in the damper piston or at the damper piston. In this configuration the damping characteristics of the damper may be influenced by way of a simple rotational movement of a rotary unit that is provided with a permanent magnet on the exterior of the damper body, when the rotary unit is properly aligned relative to the damping channel by way of the permanent magnet. One considerable advantage is that adjustment is done without any direct mechanical connection/passage from the exterior to the interior. This is highly advantageous in terms of impermeability or else in cleaning the two-wheeled vehicle by water jetting etc.

The permanent magnet at the rotary unit may be aligned both in the axial direction of the damper such that the north pole lies at one axial end and the south pole, at the other axial end, or else it is conceivable for the magnet to be aligned in the radial direction.

Both these options provide for a damping channel disposed adjacent to the permanent magnet to be partially or entirely penetrated by the magnetic field given a suitable configuration, such that the viscosity of the magneto-rheological fluid will be influenced accordingly.

With two rotary units configured as adjusting rings, one of the adjusting rings may serve to influence the damping channel of the compression stage and the other adjusting ring, to influence the damping channel of the rebound stage wherein a specified rotation will cause the magnetic field to influence a corresponding portion of the gap size of the damping channel.

In preferred more specific embodiments at least one rotary unit and at least one longitudinally movable or longitudinally displaceable adjusting member or a longitudinally movable adjusting unit is provided wherein a rotary unit may in particular be provided to be longitudinally movable. The size of the bypass channel may for example be changed by way of the rotational movement while the area portion of the transition range or the magnetic field strength effective in the damping channel may be variable e.g. by way of longitudinal displacement.

The rotational movement may also influence the transition range such as the quantity of the effective pairs of poles influencing the damping channel, or the field strength in the range fully exposed to the field, e.g. by changing the distance of the field generator from the gap.

In preferred configurations at least one control rod is provided which is preferably received at the piston rod.

In all of the configurations at least one control valve may be provided which serves for example as a one-way valve to allow separate control of the damping characteristics of the compression stage and the rebound stage.

A safety valve may as a rule be dispensed with since as large loads occur the breakaway force of the magneto-rheological fluid exposed to the magnetic field is overcome and thus a flow through the damping channel will occur over its entire cross-section although a magnetic field may be effective on part of the damping channel.

The rapid response is a considerable advantage over prior art solutions in which at least one mechanical locking component such as a spring-loaded plate must be moved. As the breakaway force is exceeded, only the inertia of the fluid delays its acceleration. The damper returns to the initial state as rapidly as soon as the load drops to a level beneath the breakaway force.

A shim valve may as a rule be dispensed with as well since due to the part exposure of the damping channel to a magnetic field the transition range which is located towards the edge of the effectiveness of the magnetic field is exposed to a magnetic field progressively attenuating towards the edge such that the breakaway force will again progressively attenuate. This leads to the presently realized smooth transition of the characteristic damper curve which provides a low damping level for weak shocks while high damping levels will occur with intense shocks. In the transition range an asymptotic rounding is achieved allowing particularly comfortable riding properties.

A considerable advantage of this solution over the prior art is that the transition range can be configured adjustable. This is because instead of having to dismantle the damper, changing the shim assembly in order to change the characteristic curve in the curve range where the transition from the low speed to the high speed range occurs, adjustment can now be done from the exterior by way of the magnetic field.

In the described configuration with an external adjusting ring the characteristic damper curve may be adjusted during operation.

An adjusting ring as a rotary unit provided external of the damper body also utilizes the benefit of a magneto-rheological damper that magnetic fields are effective for controlling passing through components such as through a damper body of aluminum.

In particularly preferred more specific embodiments at least one heat pipe device is provided comprising at least one heat pipe for dissipating the heat generated in damping. Such a heat pipe device is advantageous and readily usable in particular when adjustment of the damping properties is done through a rotary unit provided and disposed as an adjusting ring external of the damper body. Then the piston rod of the damping device may serve to receive the heat pipe since the piston rod interior is no longer used for receiving adjusting members to adjust a cross-section of the damping channel.

Preferably the heat pipe device comprises at least one heat pipe for dissipating the heat generated in damping. Furthermore a convector unit and a reflux device and a cooling device may be provided. The reflux device serves for re-circulating the heat medium that re-condenses after dissipating the heat while the convector unit in particular comprises cooling fins that serve to dissipate heat to the exterior. The reflux device may be a woven hose extending from one end to the other end of the heat pipe and transporting the liquid heat medium counter to gravitation due to capillary action.

The heat pipe is in particular filled with at least one heat medium which, given a temperature between 20° C. and 60° C., is present substantially in a vapor state and substantially in a liquid state at least. It is also possible and preferred to use a damping medium that is solid matter at temperatures of e.g. 10° C. or 20° C. while it melts and evaporates at higher temperatures.

Further preferred embodiments may provide for an auxiliary spring that is in particular configured as a pneumatic spring. The auxiliary spring may be positioned external of the body but in particular at least in part internal of the piston rod.

Another damping device according to the invention is provided for a two-wheeled vehicle and comprises at least one first damper chamber and at least one second damper chamber coupled to one another through at least one valve having at least one damping channel. A field generating device serves to generate a field in the damping channel. The damping channel contains a fluid influenceable by a field and the field generating device is provided to be effective by means of a field on the fluid in the damping channel that is influenceable by a field. The damping channel comprises at least one bypass section and at least one transition range. The field rises sharply over an area of the transition range while quasi being field-free in the bypass section such that optionally only part of the damping channel can be exposed to a field of a specific strength.

In preferred specific embodiments this damping device according to the invention comprises at least one feature of the damping device as described above.

In all the configurations it is preferred for the field effective on the damping channel to have a gradient oriented transverse to the flow direction of the fluid. The gradient is preferably oriented substantially perpendicular or normal to the flow direction of the fluid. It is advantageous that different ranges of a cross-section can have fields of different strengths. In this way the resistance of the flow paths of individual particles can differ from the resistance of adjacent flow paths. The resistance of different flow paths through the valve cross-section may preferably differ from one another by a factor of ten and in particular one hundred.

It is in particular advantageous if the field generating unit can generate an inhomogeneous field. Said field is intended to be inhomogeneous substantially transverse to the flow direction or even normal relative to the flow direction of the fluid for configuring the ranges described. A field that is inhomogeneous in the flow direction only, however, cannot achieve the described effect.

The inhomogeneity of the field allows to set the portion of the cross-sectional area that is exposed to a field of below-average and/or above-average strength. The maximal or minimal field strength effective in the cross-section does not need to be varied but the cross-sectional area is varied over which the field strength drops from the maximal to the minimal value.

By way of configuring different portions the flow of the fluid can be prohibited entirely dependent on the magnetic field and the differential pressure, only permitted in a sub-range or else in the entire damping channel. A prior-art damping device will only control the damping channel in its entirety: either flow is prohibited or flow is permitted at a flow resistance dependent on the median field strength.

The bypass section corresponds to a variable, adjustable leakage or to a variable, adjustable bypass. The present invention purposely varies and utilizes these ranges as an adjustment option to achieve particularly advantageous valve characteristic curves in a simple way.

Further advantages and characteristics of the present invention can be taken from the exemplary embodiments which will be described below with reference to the accompanying FIGS. 1 to 17.

With reference to the FIGS. 1 to 6 a first embodiment of a damping device 1 according to the invention will firstly be described. The damping device 1 is presently configured as a rear wheel damper, comprising a first end 23 and a second end 24 which are indirectly or immediately connected with the frame or the rear wheel.

Other configurations may provide for a suspension fork to be provided with a corresponding damping device 1.

Figure 1:
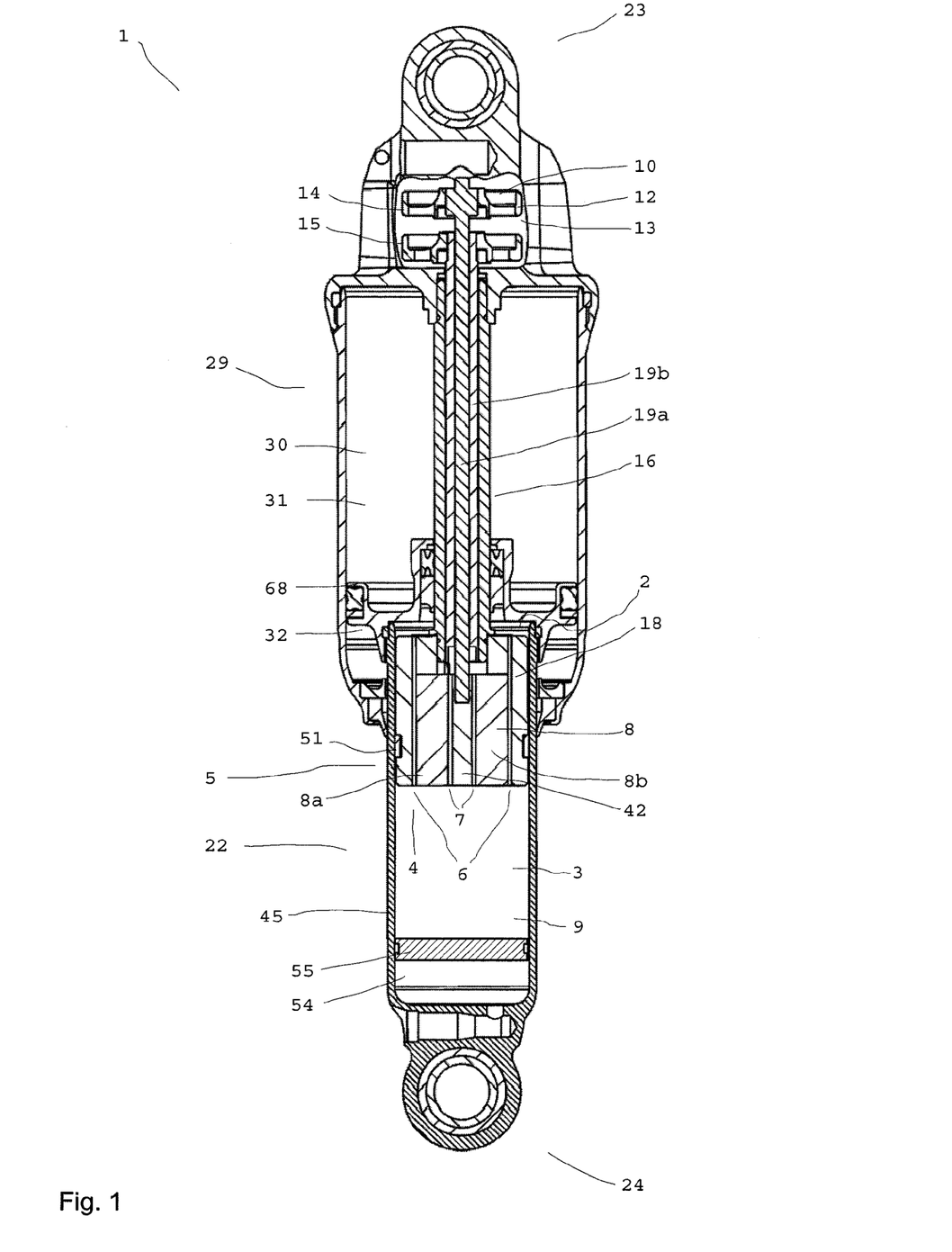
FIG. 1 a sectional side view of a first damping device according to the invention.

The damping device 1 shown in FIG. 1 in a section comprises a damper 22 which presently comprises a first damper chamber 2 and a second damper chamber 3 which are separated from one another by a damper piston 18. Damping channels 6 and 7 are provided in the damper piston 18 as valves 4 serving for damping in the compression stage and in the rebound stage.

Both the first damper chamber 2 and the second damper chamber 3 and the damping channels 6 and 7 are presently filled with a magneto-rheological fluid containing magneto-rheological particles such as carbonyl ferrous powder in a carrier liquid. The carrier liquid is preferably oil-based with additives such as stabilizers, antifreeze agents, abrasion and viscosity improvers.

A piston rod 16 follows the damper piston 18, extending through a spring device 29 presently configured as a pneumatic spring 30. The pneumatic spring 30 comprises a first spring chamber 31 and a second spring chamber 32, separated by a gas piston 68.

The first end 23 is presently provided with an adjusting device 10 comprising rotary units 14 and 15 as adjusting members 12. Said rotary unit 14 serves for adjusting the rebound stage and the rotary unit 15, for adjusting the compression stage.

The rotary units 14 and 15 are provided or connected with control rods 19a and 19b extending through the interior of the piston rod 16 and disposed coaxially relative to one another.

The end of the central control rod 19a is connected with a core 42 consisting of a magnetically conducting material. The end of the control rod 19b is connected with the magnetic device 8, which presently comprises two opposite permanent magnets 8a and 8b over the round cross-section between which non-magnetic angle segments 8c and 8d are provided.

For sealing the damper piston in the damper body a piston ring 51 may be provided as a sealing. It is likewise possible for the piston ring 51 to consist of or comprise a permanent magnet for sealing the damper pistons 18 relative to the damper body 45. In this case the magnetic field of the piston ring 51 provided with a permanent magnet causes a complete sealing from the damper body 45 since in the vicinity of the permanent magnet, chain formation of the particles is caused in the magneto-rheological fluid so as to effect sealing.

Figure 2:
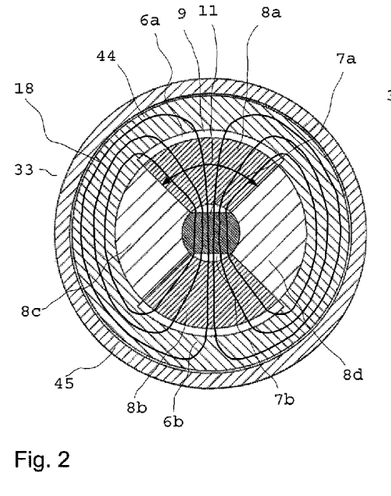
FIG. 2 a section through the damper piston of the damping device according to FIG. 1 in a first position.

FIG. 2 shows a cross-section through the damper piston with some field lines of the magnetic field 44 drawn in schematically.

In the damper body 45 the damper piston 18 is provided in which damping gaps 6a and 6b are provided for damping the compression stage and damping gaps 7a and 7b, for damping the rebound stage.

The rotary unit 15 for adjusting the compression stage comprises the magnetic device 8 which is configured as a cylindrical component and in which magnetic segments being permanent magnets 8a and 8b are separated by non-magnetic angle segments 8c and 8d. In the rotary unit 15 a central aperture is provided in which a magnetically conducting core 42 is provided. Damping gaps 7a and 7b for the rebound stage are provided between the core 42 and the segments 8a through 8d of the rotary unit 15 for the compression stage. Around the rotary unit 15 for the compression stage the damper piston 18 is provided, received slidingly displaceable—though sealed—relative to the damper body 45.

What FIG. 2 shows is the first position 33 in which both the damping gaps 6a and 6b for the compression stage and the damping gaps 7a and 7b for the rebound stage are entirely penetrated by the magnetic field 44 drawn in such that the damping channels 6 and 7 are presently exposed to a maximal magnetic field, thus raising the viscosity of the damping fluid. This is the "lock-out position" in which compressing in the compression stage and rebounding in the rebound stage is largely prevented.

As can be seen in FIG. 2, the portion 11 of the cross-sectional area exposed to a magnetic field in the lock-out position corresponds to the entire cross-section of the damping channel 6a or 6b. The damping fluid does no longer flow through the damping channels 6 and 7 but is stationary, thus preventing compression and rebound.

Figure 3:
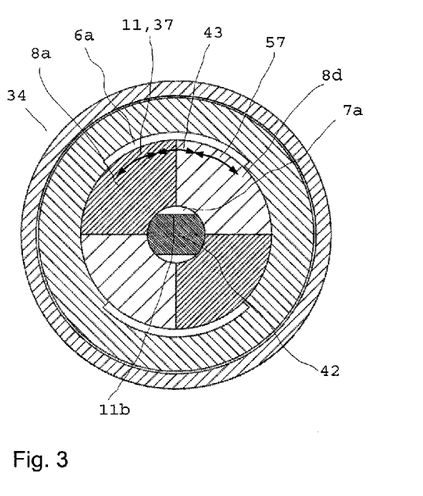
FIG. 3 a section through the damper piston of the damping device according to FIG. 1 in a second position.

When the rotary unit 15 is rotated 45 degrees counter-clockwise for adjusting the damping level of the compression stage, the second position 34 shown in FIG. 3 will be obtained in which both the damping gaps 6a and 6b of the compression stage and the damping gaps 7a and 7b of the rebound stage are exposed only partially to the magnetic field 44 of the permanent magnets 8a and 8b. The effective section 37, i.e. the portion 11 of the cross-sectional area that is entirely exposed to the magnetic field, roughly corresponds to the overlapping angle of the permanent magnet and the damping gap 6a or 6b, or to the overlapping angle of the permanent magnet and the damping channel 6.

At the edge of the overlapping range an angular range 43 ensues in which the magnetic field of the permanent magnet 8a gradually attenuates although it is still perceptibly present. In this range 43 the chain formation of the particles of the magneto-rheological fluid 9 is attenuated such that the break-away force will be lower than in the range 11a that is more exposed to the magnetic field.

In the second position 34 according to FIG. 3 an advantageous damper position is present in which both weak shocks are reliably damped and severe shocks are correspondingly damped as well since in the case of severe shocks the break-away force is overcome at least in the transition range 43 such that the characteristic damper curve can be rounded.

If the rotary unit 15 of the compression stage were rotated jointly with the rotary unit 14 for the rebound stage, then the field in the damping channel 6 of the compression stage changes as described above while the field in the damping channel 7 of the rebound stage remains nearly unchanged.

By selecting proper materials of the magnetically conducting components and adapted design, adjusting of the compression and rebound stages may occur either nearly independently from one another or if desired in combination as well.

Figure 4:
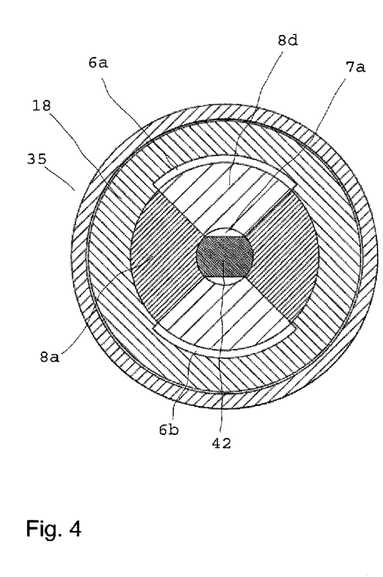
FIG. 4 a section through the damper piston of the damping device according to FIG. 1 in a third position.

FIG. 4 shows a third position 35 in which both the damping gaps 6a and 6b of the damping channel 6 for the compression stage and the damping gaps 7a and 7b are separated from the permanent magnets 8a and 8b as far as possible such that the damping gaps of the damping channels are only exposed to weak stray fields of the permanent magnets. In this position the damping level is minimal, the damper counters movements of the piston 18 relative to the damper body 45 with the lowest possible counterforce.

Figure 5:
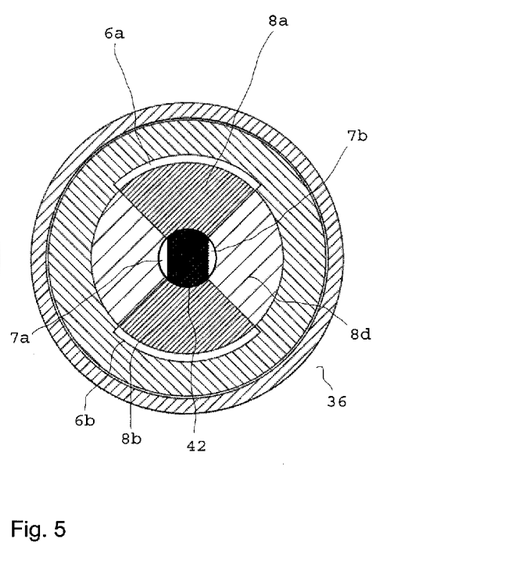
FIG. 5 a section through the damper piston of the damping device according to FIG. 1 in a fourth position.

FIG. 5 shows a cross-section of the damper piston 18 in which the damping gaps 6a and 6b of the damping channel 6 are entirely exposed to the magnetic field of the permanent magnets 8a and 8b, while the damping gaps 7a and 7b of the damping channel 7 are rotated out of the effective ranges of the permanent magnets 8a and 8b. In this state a "lock-out" is effective on the compression stage while in the rebound stage damping occurs or damping is minimal. On the whole it has been shown that adjustment of damping via permanent magnets which are capable of only exposing parts of the damping channels to a magnetic field, allows a flexible and effective damper adjustment.

The characteristic damper curve in the low-speed range is defined by the bypass section that is not at all or only minimally influenced by the magnetic field. The bypass section ensures zero passage and ensures damping for weak shocks. In the high-speed range of the characteristic damper curve the effective range exposed to the full magnetic field opens since this is where the chaining of the particles is overcome. The transition range, however, ensures a rounding of the characteristic damper curve in transition from low speed to high speed since a portion of the particles is entrained corresponding to the prevailing load. This allows an ergonomic, safe operation.

With reference to the FIGS. 6 to 11 a second embodiment of a damping device according to the invention will now be described.

Figures 6, 7, 8:
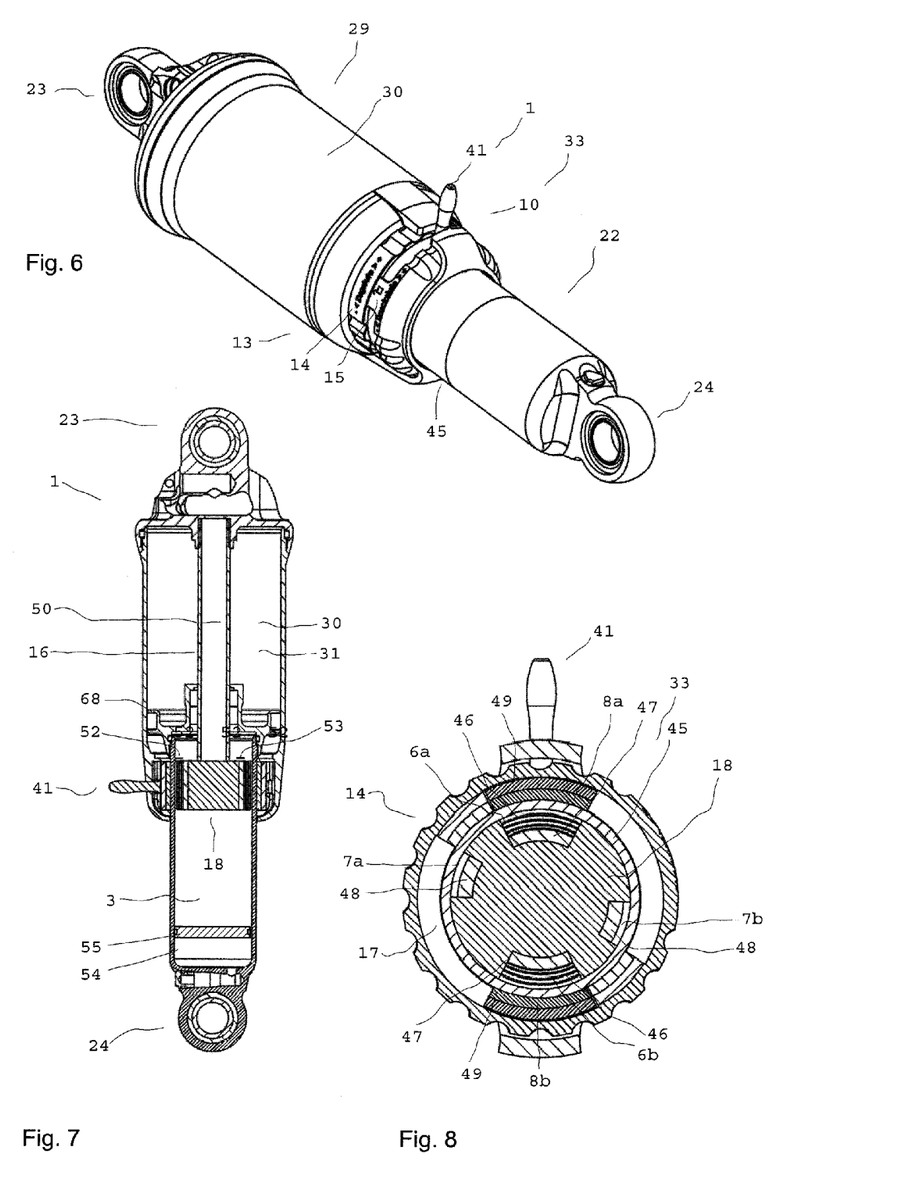
FIG. 6 a perspective view of a second damping device according to the invention.
FIG. 7 a sectional side view of the damping device according to FIG. 6.
FIG. 8 a section through the damper piston of the damping device according to FIG. 6 in a first position.

The damping device 1 comprises a damper 22 and a spring device 29 configured as a pneumatic spring 30 disposed closer to the first end 23 while the damper 22 is disposed closer to the second end 24.

In this embodiment rotary units 14 and 15 of a rotary device 13 are provided as an adjusting device 10. Unlike in the preceding embodiment the rotary unit 14 for the rebound stage and the rotary unit 15 for the compression stage are provided on the exterior of the damper body 45 and are not immediately connected to the damping channels. Presently the magnetic field 44 of the permanent magnets 8a and 8b received on the rotary units 14 and 15 acts on the damping channels 6 and 7 of the compression stage or the rebound stage passing through the wall of the damper body 45 consisting of a light metal, preferably aluminum or a fibrous composite material.

As can be seen in FIG. 7 in a sectional side view of the damping device 1, the hollow piston rod 16 comprises in its interior an auxiliary spring 50 which may be engaged parallel to the pneumatic spring 30 if desired. Engaging the auxiliary spring 50 may occur automatically in a construction presently not shown in dependence on the gas temperature so as to compensate at least in part for the temperature dependence of the characteristic spring curve. When desired the auxiliary spring 50 may be engaged manually.

Influencing the damping level occurs at the damper piston 18 which on its exterior surface is provided with damping channels for the compression stage and the rebound stage at predetermined angular distances.

To increase capacity and effectiveness, fan-shaped elements 46 are provided in the damping gaps 6a and 6b for the compression stage which are arranged substantially concentric to the outer wall of the damper 22, resulting in increased effectiveness of the magnetic field 44. Chains form in the magneto-rheological fluid along the field lines of the magnetic field 44 so as to inhibit passage through the damping channels 6, 7 provided with the fan-shaped elements 46. The maximum effect will be obtained with the field lines extending normally on the surfaces of the fan-shaped elements 46.

The fan-shaped elements 46 preferably consist of a ferromagnetic material so as to not burden the magnetic circuit with an additional "air gap". Depending on the desired transition range it may be advantageous to use a material of a specific magnetic saturation. For the damper according to FIG. 7 for example a steel alloy of a magnetic saturation of 1.6 T is provided.

For adjusting specific characteristic damper curves it is conceivable to use fans of permanent magnets or else fans of a magnetically non-conducting material.

Magnetic conductors 47 and 48 are provided at the damper piston 18 radially inwardly of the damping channels 6 and 7, serving to deflect the magnetic field effective on the damping channels 6 and 7.

The shape of the magnetic conductors 47, 48 is oriented at the configuration of the magnetic circuit. Presently a variant is shown in which the magnet 8 is bipartite along the flow direction: one pair of poles generates field lines in the direction of the piston 18 toward the internal magnetic conductors 47, 48, the second pair of poles generates field lines in the direction of the external magnetic conductor 49. The magnetic circuit is closed in the flow direction across the magnetic conductors 47, 48, 49.

When the damper piston 18 is made of a ferromagnetic material then the magnetic conductors 47, 48 may be omitted.

An operating lever 41 may serve for adjustment. The rotary units 14 and 15 configured as adjusting rings may, however, be immediately handled and rotated or else controlled via a Bowden cable.

In another variant changing from lock out to the set damping level occurs by the operating lever 14 wherein the damping level can be preset via the rotary units 14, 15.

In the first position 33 shown in FIG. 8 the damping gaps 6a and 6b for the compression stage are exposed to the maximal magnetic field while the damping gaps 7a and 7b of the damping channel 7 of the rebound stage are substantially not exposed to any magnetic field.

Figure 9:
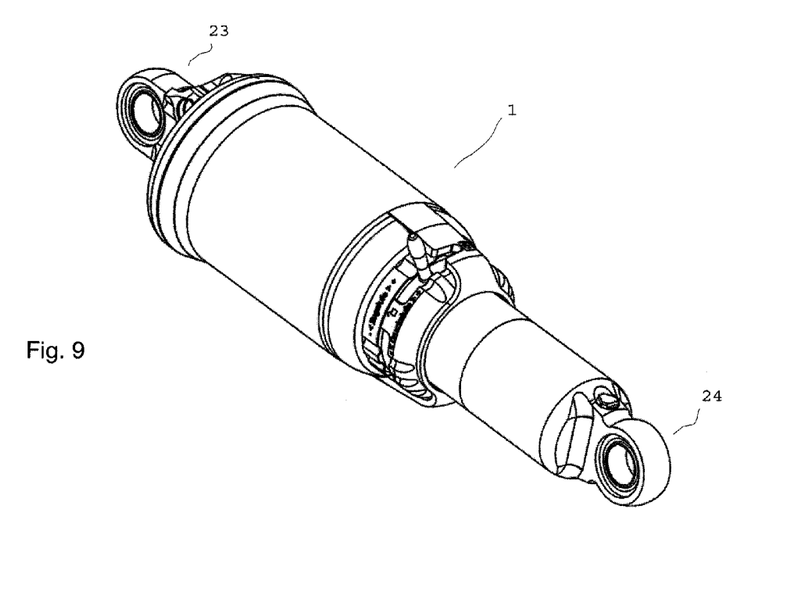
FIG. 9 a perspective view of the damping device according to FIG. 6 in a second position.
Figure 10:
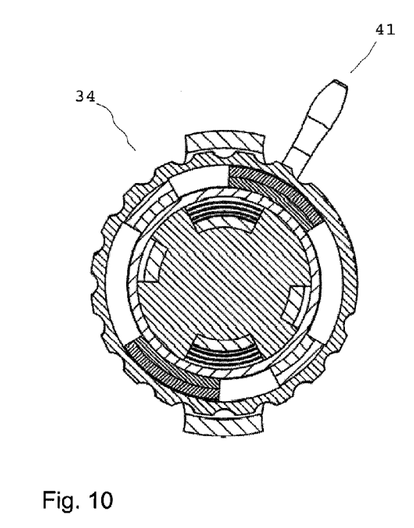
FIG. 10 a section through the damper piston of the damping device according to FIG. 6 in a second position.
Figure 11:
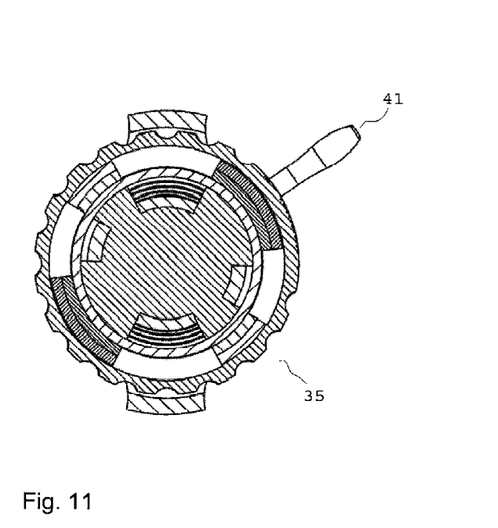
FIG. 11 a section through the damper piston of the damping device according to FIG. 6 in a third position.

FIG. 9 illustrates a perspective view of the damping device 1 wherein the operating lever 41 has been rotated clockwise such that the damping gaps 6a and 6b of the damping channel 6 are half exposed to the magnetic field of the permanent magnets 8a and 8b while the other halves of the damping gaps 6a and 6b are substantially free of a magnetic field. FIG. 10 shows a cross-section.

In this second position 34 a medium damping level of the compression stage and a low damping level of the rebound stage is present.

When the operating lever 41 is further rotated clockwise then the damping gaps 6a and 6b of the damping channel 6 are entirely released from the permanent magnets 8a and 8b such that the damping level of the compression stage reaches its minimum. This is the situation shown in FIG. 11.

In analogy to the compression stage the magnets and magnetic conductors of the rebound stage may be adjusted independently of the compression stage so as to vary the damping level of the rebound stage. Operation may for example be done through the rotary unit 14.

In another configuration variant, not shown, the adjusting rings might be positioned eccentric of the damper axis and only one damping channel each with or without fan elements might be provided for the compression stage and the rebound stage such that with rotation the distance between the permanent magnet and the damping gap will change as well and thus will the magnetic flow density in the magneto-rheological fluid.

In another configuration, not shown, variant screening elements might be rotated or else axially displaced instead of the permanent magnets so as to influence the magnetic flow through the damping channels, enlarging the transition range.

Figure 12:
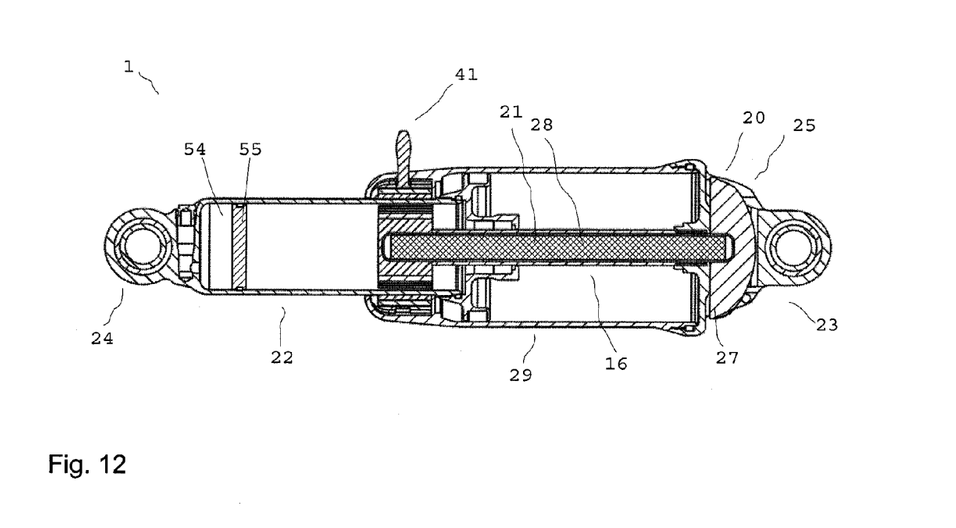
FIG. 12 a sectional side view of a third damping device according to the invention.
Figure 13:
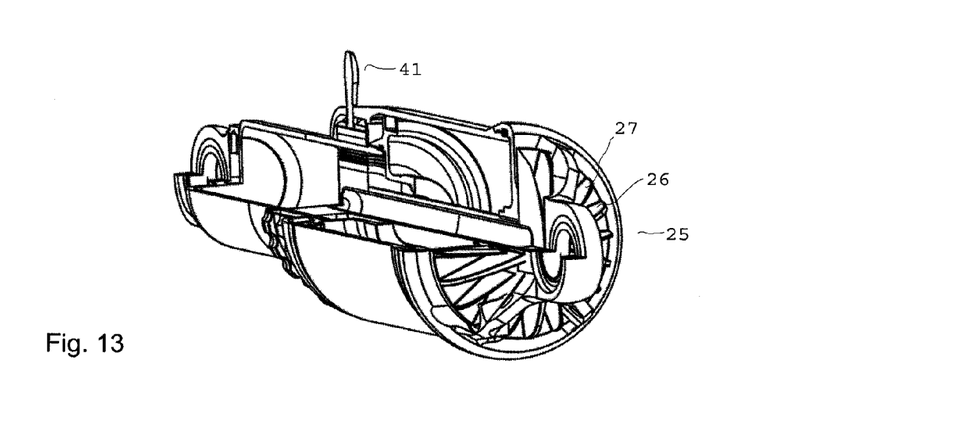
FIG. 13 a perspective, sectional detail view of the damping device according to FIG. 12.

A third embodiment is shown in FIGS. 12 and 13 wherein the damping device 1 again extends between the first end 23 and the second end 24 and comprises a damper 22 and a spring device 29 configured as a pneumatic spring.

In this embodiment adjustment of the damping properties occurs in the same way as in the preceding embodiment according to the FIGS. 6 to 11.

Unlike in the preceding embodiment, in this example according to the FIGS. 12 and 13 a heat pipe device having a heat pipe 21 is arranged in the interior of the piston rod 16. The heat pipe device absorbs the heat generated in damping at the end provided at the damper piston 18, transports the absorbed heat at a very low temperature gradient of approximately 2 or 3 Kelvin to the end 23 of the damping device 1 where the absorbed heat is dissipated through the cooling fins 26 of the convector unit 27 of the cooling device 25.

FIG. 13 shows a perspective view of the end 23 in which the convector unit 27 with the cooling fins 26 of the cooling device 25 is clearly recognizable.

Figure 14:
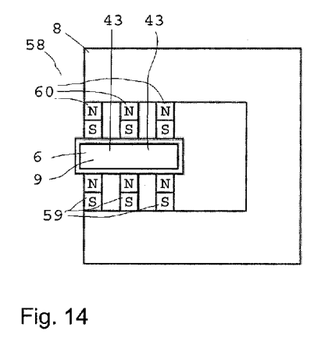
FIG. 14 a schematic view of a magnetic device having a comb structure of permanent magnets for enlarging the transition range.

FIG. 14 shows a schematic view of a magnetic device 8 which is presently configured as a permanent magnet. The permanent magnet comprises a comb structure 59 having multiple poles of permanent magnets, the prongs 59 and 60, which are axially separated from air gaps or other non-magnetic areas. The damping channel 6 is provided between the pairs of opposite prongs 59 and 60 and in this way is traversed by multiple magnetic sub-fields. Each opposite pair of prongs 59 and 60 generates a portion 11 of the cross-sectional area or effective section 37 in which the full magnetic field is effective. Between these a transition range 43 is exposed to one sub-field only.

In relation to the configuration of the magnetic device and/or the field strengths—in the orientation of the FIG. 14, horizontal—the ranges lying between two prongs may be subdivided into a transition range 43, a bypass section 57 without a field, and another transition range 43. If desired, only one transition range 43 may lie between the first and second prongs—again viewed e.g. from the left to the right—while an intermediate bypass section 57 without a field lies between the prongs 2 and 3.

The transition ranges 43 result in a rounding of the characteristic damper curve at the transition from the low-speed to the high-speed range and the bypass sections 57, to a zero passage in the force-velocity diagram.

Figure 15:
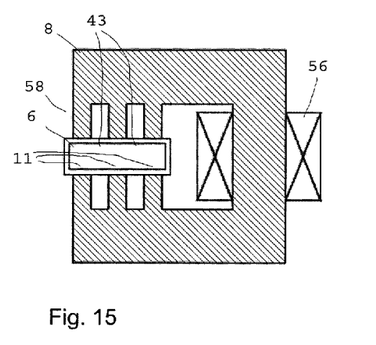
FIG. 15 a schematic view of an electromagnetic device having a comb structure for enlarging the transition range.

FIG. 15 schematically shows a magnetic device 8 having a comb structure or a comb section 58 with an electric coil 56 serving for generating the magnetic field. All of the prongs 59 are simultaneously exposed to the magnetic field of the electric coil 56 such that again, multiple transition ranges 43 and if desired bypass sections 57 are generated. Optionally, multiple electric single coils 56 may be provided for example at each prong to be able to separately influence the magnetic fields between each of the prong pairs 59 and 60.

At any rate the comb structure or multiple pairs of poles allow to considerably vary, increasing or decreasing the transition range 43.

By means of the transition range 43 or the multiple transition ranges a damper is provided which allows a smooth transition of the characteristic damper curve from weak to heavy loads. The characteristic damper curve has a zero passage in the force-velocity diagram. The transition radius from the low-speed range to the high-speed range is adjustable via the size of the transition range 43.

Figure 16:
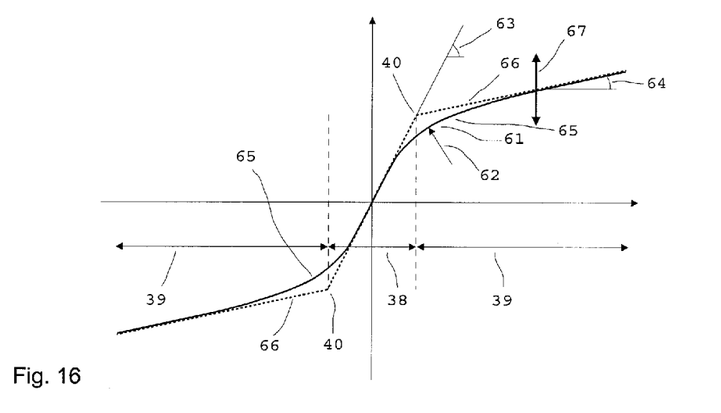
FIG. 16 a schematic view of a characteristic damper curve.

A characteristic damper curve 65 of the damper according to the invention is illustrated in FIG. 16 in a force-velocity diagram of the damper piston. The low-speed range 38 and the high-speed range 39 are connected with a radius 62 through a smooth rounding 61. In the low-speed range 38 the gradient 63 of the characteristic damper curve is substantially determined by the bypass section 57. In the high-speed range 39 or in the high-speed ranges 39 for the rebound and compression stages the gradient 64 is substantially determined by the effective section 37 of the damping channel 6 where the full magnetic field is effective.

The transition range 43 over the extension of which an attenuating magnetic field is effective, causes the advantageous, non-linear contour with the rounding 61 which is at the root of a comfortable and safe operation.

What is also drawn in is an arrow 67 showing the effect of a magnetic field having different strengths. Given a stronger magnetic field, the characteristic curve will shift upwardly while with a weaker magnetic field it will shift downwardly.

Dashed lines show a characteristic damper curve 66 which would be present without any transition range 43 if, other than the magneto-rheological damping channel 6, an additional bypass channel were provided. In such a damper the resistance in the damping channel would be overcome at the break point 40 and the damping level would change instantaneously which might lead to undesirable riding characteristics of a bicycle. The gradient in the low-speed range 38 is adjustable by means of the area portion of the bypass section 57. The larger the bypass section 57, the smaller the gradient. The zero passage is again generated by the bypass section 57 since damping fluid can at any time flow through the bypass section 57 without being influenced such that damper piston movement will already be triggered by low forces.

The gradient in the high-speed range 39 is influenced by the effective section 37 and the magnetic field.

The range with the rounding 61 in-between which is significant for comfort and safety is rounded by way of the transition range 43 of the damping channel so as to enable an ergonomic and safe operation. The size of the rounded range follows from the size and shape of the transition range 43.

The field in the transition range 43 is highly inhomogeneous such that the ratio from the highest field value to the lowest field value within the transition range 43 is larger than ten and preferably larger than one hundred.

Figure 17:
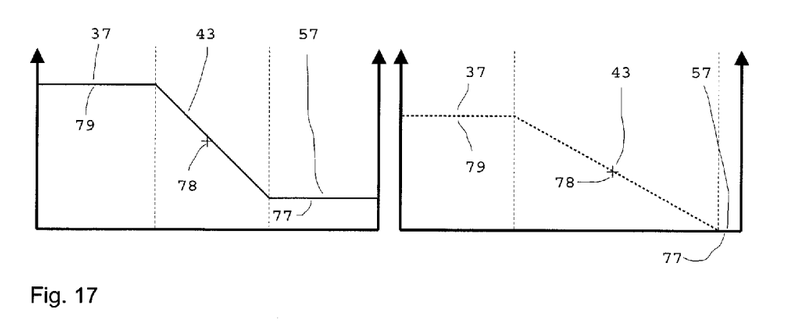
FIG. 17 shows schematically two field strength lines over the cross-section of the damping channel.

FIG. 17 shows schematically two field strength lines over the cross-section of the damping channel 6. In the left half the field strength line is illustrated highly schematically in a first setting.

In the bypass section 57 an approximately homogeneous field is present comprising a first mean value 77. In the transition range 43 the field is highly inhomogeneous, comprising a steep gradient. In the transition range 43 the field shows a significantly increased, second mean value 78. The field strength line over the effective section 37 remains approximately at the same level, comprising a third mean value 79. The area portion of the effective section 37 is presently approximately one third, as is the area portion of the transition range 43 and of the bypass section 57. The respective area portions and the fields prevailing therein depend on the current adjusting conditions. In particular can spatial and/or time-related fluctuations of the field strength also be present in the effective section 37 and in the bypass section 57.

The right half of FIG. 17 illustrates the field lines over the cross-section of the damping channel with different settings. This is where the area portion of the effective section 37 is approximately one third again. The transition range 43 is considerably larger and the bypass section, correspondingly smaller. The mean values 77, 78 and 79 are adapted accordingly wherein the third mean value 79 does not need to have been changed. This illustration shows that the field over the damping channel is highly inhomogeneous. The size of each component or section may be variable so as to provide simplicity of adapting the damping characteristics.

LIST OF REFERENCE NUMERALS 1 damping device
2, 3 damper chamber
4 flow connection
5 valve
6 damping channel
6a damping gap for the compression stage
6b damping gap for the compression stage
7 damping channel
7a damping gap for the rebound stage
7b damping gap for the rebound stage
8 magnetic device
8a, 8b permanent magnet
8c, 8d non-magnetic angle segment
9 magneto-rheological fluid
10 adjusting device
11 portion, area portion, volume portion
12 adjusting member
13 rotary device
14 rotary unit for the rebound stage
15 rotary unit for the compression stage
16 piston rod
17 exterior
18 damper piston
19a, 19b control rod
20 heat pipe device
21 heat pipe
22 damper
23 first end
24 second end
25 cooling device
26 cooling fin
27 convector unit
28 reflux device
29 spring device
30 pneumatic spring
31, 32 spring chamber
33 first position
34 second position
35 third position
36 fourth position
37 effective section
38 low-speed range
39 high-speed range
40 break point
41 operating lever
42 core
43 transition range
44 magnetic field
45 damper body
46 fan-shaped element
47-49 magnetic conductor
50 auxiliary spring
51 piston ring
52 one-way valve
53 one-way valve
54 differential spring
55 floating piston
56 electric coil
57 bypass section
58 comb section, comb structure
59, 60 prong
61 rounding
62 radius
63, 64 gradient
65, 66 characteristic damper curve
67 arrow
68 piston
77 first mean value
78 second mean value
79 third mean value

The invention claimed is:

1. A damping device for a two-wheeled vehicle, comprising:
    at least one first damper chamber and at least one second damper chamber which are coupled to one another through at least one valve having at least one damping channel, and having a field generating device, wherein a fluid influenceable by a field is provided in the damping channel and the field generating device generates a field that influences in the damping channel;

at least one adjusting device configured to adjust at least a portion of a cross-section of the damping channel that is exposed to the field, said adjusting device including at least one rotary device, said at least one rotary device including a rotary unit for adjusting at least one damping channel for the rebound stage and a rotary unit for adjusting at least one damping channel for the compression stage, wherein the at least one rotary device for adjusting at least one damping channel for the rebound stage and the rotary unit for adjusting at least one channel for the compression stage are configured coaxially;

wherein optionally only part of the cross-section of the damping channel can be exposed to the field.

2. The damping device according to claim 1 wherein a volume portion of the damping channel exposed to the field is adjustable by means of the adjusting device.

3. The damping device according to claim 1, wherein the damping channel comprises at least one effective section exposed to the field or a bypass section that is not exposed to the field wherein at least one transition range is adjacent to the effective section or bypass section.

4. The damping device according to claim 3, wherein the transition range is adjustable.

5. The damping device according to claim 1, wherein the field generating device comprises a magnetic device for generating a magnetic field and wherein the fluid comprises a magneto-rheological fluid.

6. The damping device according to claim 1, wherein the magnetic device comprises at least one permanent magnet.

7. The damping device according to claim 1, wherein the at least one rotary device is provided approximately coaxially to a piston rod.

8. The damping device according to claim 1, wherein at least one rotary unit is provided on the exterior of a damper chamber.

9. The damping device according to claim 1, wherein at least one control valve is provided.

10. The damping device according to claim 1, wherein an auxiliary spring is provided which is in particular configured as a pneumatic spring and is disposed in a piston rod.

11. The damping device according to claim 10, wherein the auxiliary pneumatic spring in the piston rod is engaged by a user or automatically continuously or in increments in dependence on the temperature.

12. The damping device according to claim 1, wherein adjustment of the damping level occurs solely by the magnetic field.

13. The damping device according to claim 1, wherein the field and in particular the magnetic field is effective passing through the damper body.

14. The damping device according to claim 1, wherein shifting between preset stages occurs via an operating lever.

15. The damping device according to claim 1, wherein the portion of the damping channel not exposed to any field thus being effective as a bypass section, can be varied via an adjusting device.

16. The damping device according to claim 1, wherein the portion of the damping channel that is exposed to a partial field, which is the transition range from the weakest to the strongest range of the magnetic field, is variable.

17. The damping device according to claim 1, wherein sealing of the damper piston relative to the housing wall occurs by means of permanent magnets.

18. The damping device according to claim 1, wherein at least one adjustable mechanical shut-off valve for shutting off at least one damping channel is provided.

19. The damping device according to claim 1, further comprising
at least one bypass section and at least one transition range provided in the damping channel, wherein the field rises sharply over an area of the transition range while quasi being field-free in the bypass section such that optionally only part of the damping channel is exposed to a field of a specific strength.

20. The damping device according to claim 1, wherein the adjusting device comprises at least one longitudinally displaceable adjusting member.

21. The damping device according to claim 7, wherein a control rod is received on the piston rod.

22. The damping device according to claim 1, wherein a heat pipe device is provided having at least one heat pipe for dissipating a heat generated in damping.

23. The damping device according to claim 5, wherein multiple transition ranges in the damping channel can be generated by multiple pole pairs of the magnetic device.

24. The damping device according to claim 5, wherein the magnetic field is generated by a current-carrying coil.

* * * * *